US012580297B2

(12) United States Patent
Kim et al.

(10) Patent No.: US 12,580,297 B2
(45) Date of Patent: Mar. 17, 2026

(54) ANTENNA MODULE FOR VEHICLE AND VEHICLE INCLUDING THE SAME

(71) Applicant: Samsung Electronics Co., Ltd., Suwon-si (KR)

(72) Inventors: Hyunggon Kim, Suwon-si (KR); Daeyoung Oh, Suwon-si (KR); Jeseung Oh, Suwon-si (KR); Jeonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 18/323,754

(22) Filed: May 25, 2023

(65) Prior Publication Data

US 2024/0072414 A1 Feb. 29, 2024

Related U.S. Application Data

(63) Continuation of application No. PCT/KR2023/006448, filed on May 12, 2023.

(30) Foreign Application Priority Data

Aug. 29, 2022 (KR) ........................ 10-2022-0108718
Oct. 21, 2022 (KR) ........................ 10-2022-0136831

(51) Int. Cl.
*H01Q 21/24* (2006.01)
*H01Q 1/22* (2006.01)
*H01Q 1/32* (2006.01)

(52) U.S. Cl.
CPC ......... *H01Q 1/2283* (2013.01); *H01Q 1/3275* (2013.01); *H01Q 21/24* (2013.01)

(58) Field of Classification Search
None
See application file for complete search history.

(56) References Cited

U.S. PATENT DOCUMENTS 7,548,582 B2 6/2009 Kim et al.
10,056,922 B1 8/2018 Tsvelykh et al.
(Continued)

FOREIGN PATENT DOCUMENTS

KR 10-2004-0082890 A 9/2004
KR 10-0627154 B1 9/2006
(Continued)

OTHER PUBLICATIONS

International Search Report dated Aug. 17, 2023, issued in International Application No. PCT/KR2023/006448.
(Continued)

*Primary Examiner* — Dameon E Levi
*Assistant Examiner* — Anh N Ho
(74) *Attorney, Agent, or Firm* — Jefferson IP Law, LLP

(57) ABSTRACT

An antenna device for a vehicle and a vehicle including the same are provided. The antenna device includes a printed circuit board (PCB), a plurality of antenna arrays arranged on a first surface of the PCB, a plurality of radio frequency integrated circuits (RFICs) arranged on a second surface of the PCB and electrically connected to the plurality of antenna arrays, and an intermediate frequency integrated circuit (IFIC) arranged on the second surface of the PCB to be apart from each of the plurality of RFICs by a same distance, the IFIC being electrically connected to the plurality of RFICs.

19 Claims, 22 Drawing Sheets

(56) References Cited

U.S. PATENT DOCUMENTS

| | | | |
|---|---|---|---|
| 10,347,967 | B2 | 7/2019 | Ganchrow et al. |
| 11,284,513 | B2 | 3/2022 | Yoo et al. |
| 2016/0150542 | A1* | 5/2016 | Tarighat Mehrabani .................... H04W 16/28 370/329 |
| 2016/0306034 | A1 | 10/2016 | Trotta et al. |
| 2018/0231657 | A1 | 8/2018 | Woehlte |
| 2019/0089419 | A1 | 3/2019 | Kim et al. |
| 2019/0120931 | A1 | 4/2019 | Mihajlovic et al. |
| 2019/0131691 | A1 | 5/2019 | Hong et al. |
| 2019/0323785 | A1* | 10/2019 | Eid ..................... H01L 25/0652 |
| 2020/0144733 | A1 | 5/2020 | Chakraborty et al. |
| 2020/0212548 | A1* | 7/2020 | Imamura .................. H01Q 1/48 |
| 2020/0243957 | A1* | 7/2020 | Ueda ........................ H01Q 1/38 |
| 2021/0013596 | A1 | 1/2021 | Loesch et al. |
| 2021/0305688 | A1 | 9/2021 | Kim et al. |
| 2021/0391641 | A1* | 12/2021 | Son .......................... H04B 1/40 |
| 2022/0029272 | A1 | 1/2022 | Hong et al. |
| 2022/0069450 | A1 | 3/2022 | Kim et al. |
| 2022/0094054 | A1* | 3/2022 | Reda ...................... H01Q 21/06 |
| 2022/0094078 | A1* | 3/2022 | Ma ......................... H01Q 21/28 |
| 2022/0225168 | A1 | 7/2022 | Kim |
| 2022/0322132 | A1 | 10/2022 | Kim |
| 2023/0085064 | A1* | 3/2023 | Shi ....................... H01Q 21/065 343/702 |
| 2023/0087065 | A1* | 3/2023 | Sikri .................... H04B 7/0617 |
| 2023/0119719 | A1 | 4/2023 | Kang et al. |
| 2023/0140472 | A1 | 5/2023 | Lee |
| 2023/0420829 | A1* | 12/2023 | Lee ........................ H01Q 1/245 |
| 2024/0021979 | A1 | 1/2024 | Shin et al. |
| 2024/0405444 | A1* | 12/2024 | Varonen ................... H01Q 3/36 |

FOREIGN PATENT DOCUMENTS

| | | | |
|---|---|---|---|
| KR | 10-1936252 | B1 | 1/2019 |
| KR | 10-2020-0117575 | A | 10/2020 |
| KR | 10-2021-0020667 | A | 2/2021 |
| KR | 10-2234000 | B1 | 3/2021 |
| KR | 10-2021-0084463 | A | 7/2021 |
| KR | 10-2021-0091175 | A | 7/2021 |
| KR | 10-2021-0091176 | A | 7/2021 |
| KR | 10-2021-0134815 | A | 11/2021 |
| KR | 10-2021-0135339 | A | 11/2021 |
| KR | 10-2022-0000633 | A | 1/2022 |
| KR | 10-2022-0000757 | A | 1/2022 |
| KR | 10-2022-0067491 | A | 5/2022 |
| KR | 10-2402492 | B1 | 5/2022 |
| KR | 10-2022-0103519 | A | 7/2022 |
| WO | 2021/252036 | A1 | 12/2021 |

OTHER PUBLICATIONS

Extended European Search Report dated Oct. 10, 2025, issued in European Patent Application No. 23860593.5.

* cited by examiner

ANTENNA MODULE FOR VEHICLE AND VEHICLE INCLUDING THE SAME

CROSS-REFERENCE TO RELATED APPLICATION(S)

This application is a continuation application, claiming priority under § 365(c), of an International application No. PCT/KR2023/006448, filed on May 12, 2023, which is based on and claims the benefit of a Korean patent application number 10-2022-0108718, filed on Aug. 29, 2022, in the Korean Intellectual Property Office, and of a Korean patent application number 10-2022-0136831, filed on Oct. 21, 2022, in the Korean Intellectual Property Office, the disclosure of each of which is incorporated by reference herein in its entirety.

TECHNICAL FIELD

The disclosure relates to an antenna module for a vehicle and a vehicle including the same.

BACKGROUND ART

Recently, various communication services and multimedia services have been increasingly provided with respect to a vehicle. Due to the development of autonomous vehicles, the need has gradually increased for communication technologies for enabling continual communication with ambient infrastructures and vehicles and exchanging and sharing of information about traffic situations. Thus, a multiple-input and multiple-output (MIMO) communication technology for seamlessly supporting a large amount of information has been implemented in a vehicle, and the number of antennas which have to be mounted on the vehicle has also significantly increased compared to the related art.

A vehicle may use antennas to transmit and/or receive a radio frequency (RF) signal including a sound signal or data (e.g., a message, a photo, a video image, a music file, or a game). For example, the vehicle may perform communication by using a high frequency (e.g., the $5^{th}$ generation (5G) millimeter wave (mmWave)).

The mmWave communication may implement a method of sending a signal, such as sound, an image, and the like, via conversion of the signal from an ultra-high RF band of 28 to 40 gigahertz (GHz) to a baseband frequency through an intermediate frequency (IF). The reason of using the IF may be to increase a frequency selectivity as well as to improve the sensitivity and the stability. However, because the IF also uses a high RF band of about 10 GHz, an insertion loss of a signal may occur.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an antenna device for a vehicle for designing a minimum distance between a radio frequency integrated circuit (RFIC) and an intermediate frequency integrated circuit (IFIC) and a vehicle including the antenna device.

Another aspect of the disclosure is to provide an antenna device for stably fixing an antenna array, an RFIC, and an IFIC and a vehicle including the antenna device.

Another aspect of the disclosure is to provide an antenna device for adjusting a position of an antenna array and a vehicle including the antenna device.

Additional aspects will be set forth in part in the description which follows and, in part, will be apparent from the description, or may be learned by practice of the presented embodiments.

Solution to Problem

In accordance with an aspect of the disclosure, an antenna device for a vehicle is provided. The antenna device includes a printed circuit board (PCB).

The antenna device, according to an embodiment of the disclosure, includes a plurality of antenna arrays arranged on a first surface of the PCB to be apart from each other.

The antenna device, according to an embodiment of the disclosure, includes a plurality of radio frequency integrated circuits (RFICs) arranged on a second surface facing the first surface of the PCB and respectively corresponding to and electrically connected to the plurality of antenna arrays.

The antenna device, according to an embodiment of the disclosure, includes an intermediate frequency integrated circuit (IFIC) arranged on the second surface of the PCB to be apart from each of the plurality of RFICs by a same distance, the IFIC being electrically connected to each of the plurality of RFICs.

In accordance with another aspect of the disclosure, a vehicle is provided. The vehicle includes a main body including an opening.

The vehicle according to an embodiment of the disclosure includes a PCB arranged in the opening.

The vehicle according to an embodiment of the disclosure includes a plurality of antenna arrays arranged on a first surface of the PCB to be apart from each other, the first surface being toward an outside of the main body.

The vehicle according to an embodiment of the disclosure includes a plurality of RFICs arranged on a second surface of the PCB, the second surface being toward an inside of the panel, the plurality of RFICs being respectively corresponding to and electrically connected to the plurality of antenna arrays.

The vehicle according to an embodiment of the disclosure includes an IFIC arranged on the second surface of the PCB to be apart from each of the plurality of RFICs by a same distance, the IFIC being electrically connected to the plurality of RFICs.

Advantageous Effects of Disclosure

According to the disclosure, a minimum distance between radio frequency integrated circuits (RFICs) and an intermediate frequency integrated circuit (IFIC) may be designed, and thus, an insertion loss of an intermediate frequency (IF) signal may be reduced.

According to the disclosure, the minimum distance between the RFICs and the IFIC may be designed, and thus, an antenna module having a small size may be implemented, and thus, costs may be reduced.

Antenna arrays, the RFICs, and the IFIC may be arranged on a rigid printed circuit board (PCB), and thus, when yielding, a process difficulty may be decreased, and the yield efficiency may be increased.

When a flexible PCB is arranged between the antenna arrays and the IFIC, an angle of the antenna arrays with respect to the IFIC may be adjusted, and thus, the antenna efficiency may be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
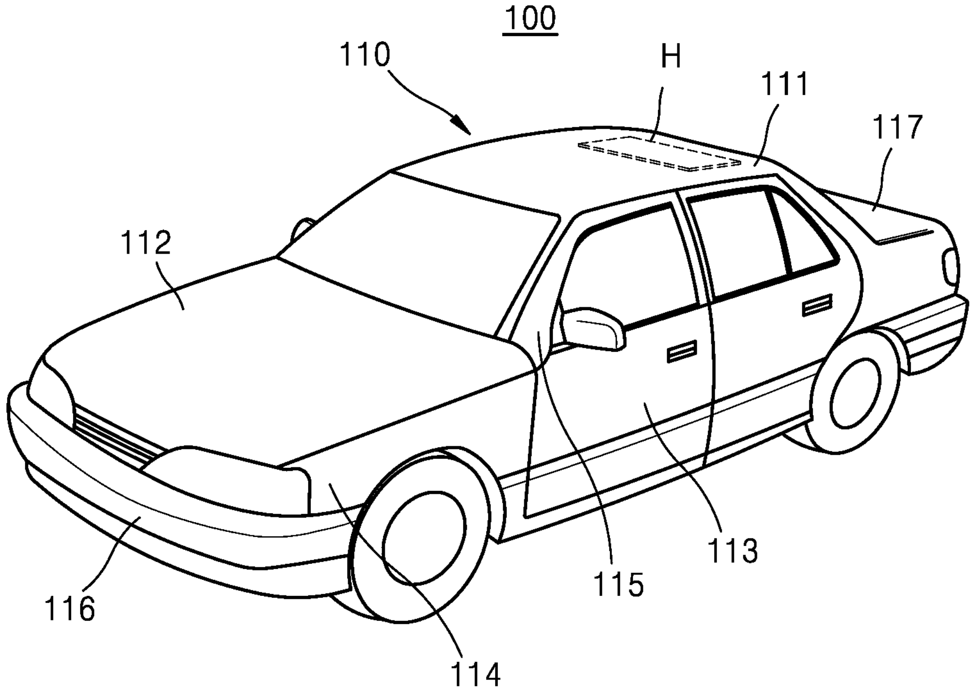
FIG. 1 is a diagram of a vehicle on which an antenna module is mounted, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part is referred to as being "connected" to other parts, the part may be "directly connected" to the other parts or may be "electrically connected" to the other parts with other devices therebetween. Also, when a part "includes" a certain element, unless it is specifically mentioned otherwise, the part may further include another component and may not exclude the other component.

The expressions such as "in some embodiments of the disclosure," "according to an embodiment of the disclosure," and the like described in various parts of this specification do not necessarily refer to the same embodiment of the disclosure as one another.

One or more embodiments of the disclosure may be described as functional block components and various processing operations. Part or all of such functional blocks may be realized by various numbers of hardware and/or software components configured to perform specified functions. For example, functional blocks of the disclosure are realized by one or more processors or micro-processors or by circuit structures for performing intended functions. Also, for example, the functional blocks of the disclosure are realized by various programming or scripting languages. The functional blocks may be realized by algorithms executed by one or more processors. Furthermore, the disclosure could employ conventional techniques for electronics configuration, signal processing and/or data control. The words "module," "component," and the like may be broadly used and are not limited to mechanical or physical components.

In addition, connection lines or connection members between components illustrated in the drawings are intended to represent example functional connections and/or physical or logical connections between the components. It should be noted that many alternative or additional functional connections, physical connections or logical connections may be present in a practical device.

Also, the expression "at least one of A, B, or C" indicates any one of "A," "B," "C," "A and B," "A and C," "B and C," and "A, B, and C."

A vehicle 100 and an antenna module 200 for a vehicle, according to an embodiment of the disclosure, will be described in detail below with reference to the accompanying drawings. In the accompanying drawings, like elements are indicated by using like reference numerals. Also, throughout the detailed descriptions, like elements are referred to by using like terms.

FIG. 1 is a diagram of a vehicle on which an antenna module is mounted, according to an embodiment of the disclosure.

Referring to FIG. 1, the antenna module for a vehicle according to an embodiment of the disclosure may be arranged outside or inside a vehicle 100.

In detail, the antenna module for a vehicle may be mounted in a shark fin module on the glass or the roof outside the vehicle 100.

Alternatively, the antenna module for a vehicle according to an embodiment of the disclosure may be mounted on a main body of the vehicle 100. When an antenna is mounted on the glass of the vehicle 100, the antenna may also be damaged when the glass is damaged by external shocks, and a length of a cable for connecting the antenna and a printed circuit board (PCB) module may be increased. Also, when two or more antennas are formed or mounted on the glass for supporting diversity, an isolation issue between the antennas may occur. Also, the shark fin module has the form exposed to the outside of the vehicle 100, and thus, the shark fin module may also have a risk of being damaged by external shocks. In addition, due to a small size of the shark fin module, the size of the antenna may also be reduced, and thus, a radiation capability (or a broadcasting reception capability) of the antenna may be degraded. Also, when a number of antennas have to be mounted to receive various signals, the number of shark fin modules may be increased. When the antenna module 200 for a vehicle is mounted on the main body of the vehicle 100, the antenna module 200 for a vehicle may not be exposed to the outside, unlike the antennas mounted on the glass or the shark fin module, as described above. Thus, the risk of fracture may be reduced, and an exterior shape of the vehicle 100 may not be damaged.

Referring again to FIG. 1, an antenna module (not shown) may be mounted in an area H on an upper panel 110 forming an exterior shape of the vehicle 100. For example, an area 11 of an upper panel 110 may be formed to be open so as to couple the antenna module to the upper panel 110. Also, the area H may be an opening of the upper panel 110.

Further, FIG. 1 illustrates a case where the antenna module is mounted in the area H of an upper portion of the vehicle 100, as an example. However, the antenna module may be mounted in any inside or outside position of the vehicle 100.

For example, the antenna module is mounted on a lower area or an inner area of at least one of a bonnet panel 112, a door panel 113, a fender panel 114, a pillar panel 115, a bumper panel 116, or a trunk panel 117 of the vehicle.

Figure 2:
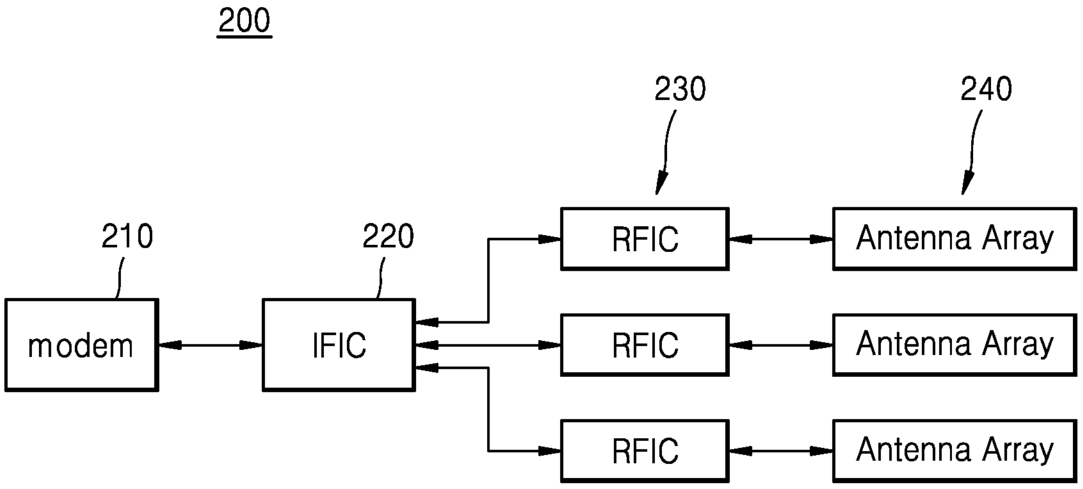
FIG. 2 is a block diagram of an antenna module according to an embodiment of the disclosure.

FIG. 2 is a block diagram of an antenna module according to an embodiment of the disclosure.

Referring to FIG. 2, an antenna module 200 may transmit or receive a signal to and from an external device through a wireless network. The antenna module 200 may transmit or receive a high-frequency broadband signal. For example, the antenna module 200 transmits or receives a signal of a higher frequency than a fourth generation (4G) network. The antenna module 200 may transmit or receive a radio signal of a millimeter-wave (hereinafter, referred to as "mmWave") band, for example, a fifth generation (5G) signal. The 5G signal may be, for example, a signal of a band of about 28 GHz.

According to an embodiment of the disclosure, the antenna module 200 may include a modem 210, an intermediate frequency integrated circuit (IFIC) 220, a plurality of radio frequency integrated circuits (RFICs) 230, and a plurality of antenna arrays 240. In addition, the antenna module 200 may have various modifications according to various embodiments of the disclosure described in this specification.

According to another embodiment of the disclosure, the modem 210 may support a signal of an mmWave band. For example, the modem 210 supports next-generation communications including 5G communication. The modem 210 may include a communication processor (CP).

According to yet another embodiment of the disclosure, the IFIC 220 may transmit, to the RFICs 230, a signal received from the modem 210, or may transmit, to the modem 210, a signal received from the RFICs 230. For example, the IFIC 220 is arranged between the modem 210 and the RFICs 230. The IFIC 220 may process an intermediate frequency (IF) signal. The IF signal may be, for example, a signal of a band of about 7 to 11 GHz.

According to yest another embodiment of the disclosure, the IFIC 220 may transmit or receive the IF signal to or from the RFIC 230 through a connection line 260. The connection line 260 may include, for example, a coaxial cable or a flexible printed circuit board (FPCB).

According to yet another embodiment of the disclosure, the RFICs 230 may process a radio frequency (RF) signal and may transmit or receive a signal of an RF band to or from an external device (e.g., a base station). The RFIC 230 may convert a signal of an RF band into a signal of an IF band. The RFIC 230 may convert the IF signal obtained from the IFIC 220 into the RF signal or may convert the RF signal obtained through the antenna arrays 240 into the IF signal. According to an embodiment of the disclosure, the RF signal may be a signal of an mmWave band.

According to yet another embodiment of the disclosure, the antenna arrays 240 may transmit or receive a signal of a high frequency and a broadband. The antenna arrays 240 may be 5G antennas. The antenna arrays 240 may include a plurality of antenna elements (not shown) arranged to form a directional beam. The plurality of antenna elements may include, for example, patch antennas, loop antennas, or dipole antennas.

Referring to FIG. 2, the antenna module 200 may support a heterodyne scheme. One IFIC 220 may be electrically connected to the plurality of RFICs 230. Because one IFIC 220 may be selectively connected to at least one of the plurality of RFICs 230 and transmit or receive an IF signal to or from the at least one of the plurality of RFICs 230, the communication performance may be improved, and omni-directional beamforming may become easily achieved.

Figure 3A:
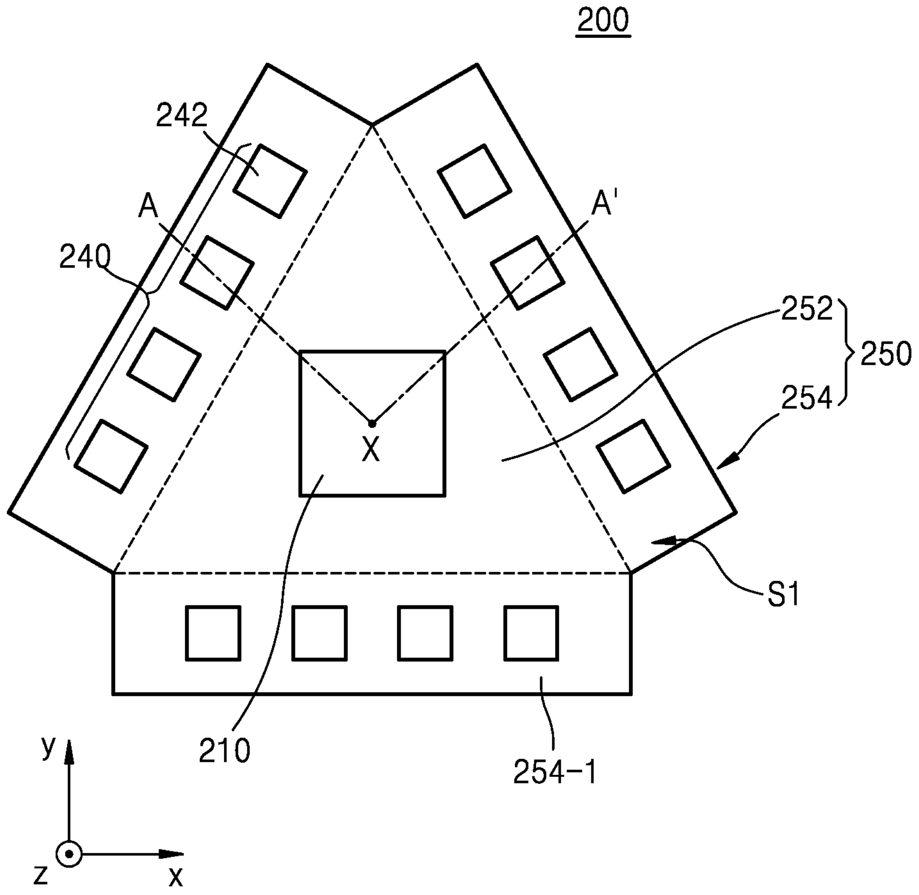
FIG. 3A is a downwardly viewed-plan view of an antenna module, according to an embodiment of the disclosure.

FIG. 3A is a downwardly-viewed plan view of the antenna module according to an embodiment of the disclosure.

Figure 3B:
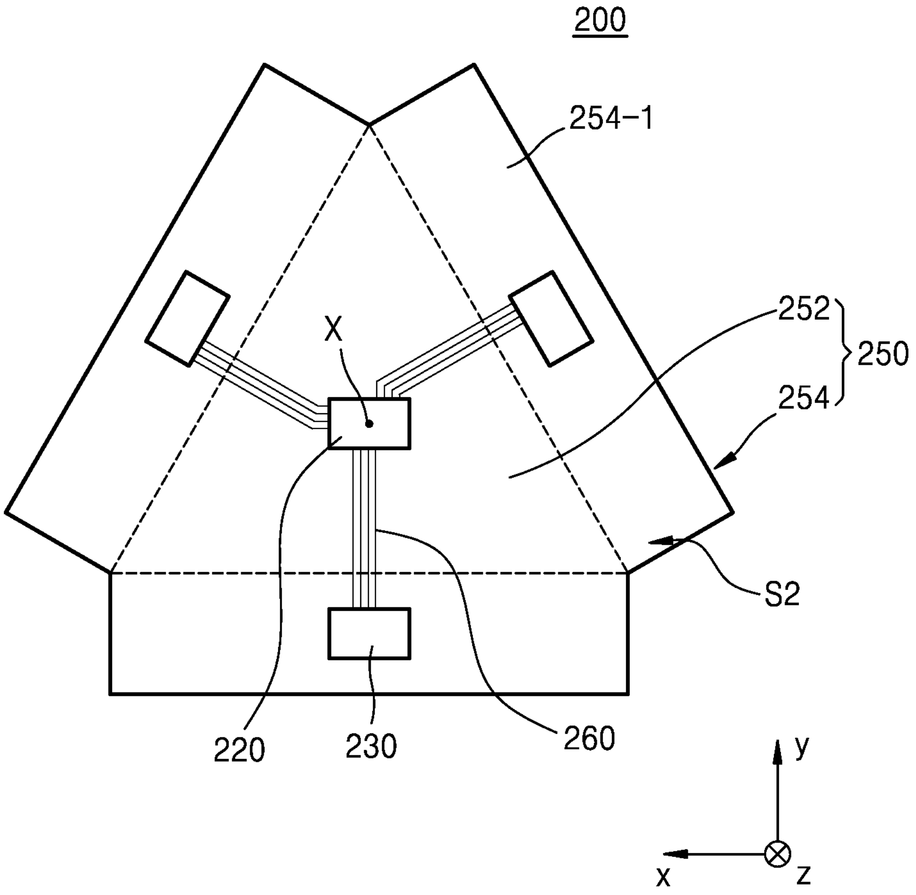
FIG. 3B is a plan view of the antenna module of FIG. 3A according to an embodiment of the disclosure.

FIG. 3B is a plan view of the antenna module of FIG. 3A according to an embodiment of the disclosure.

Figure 3C:
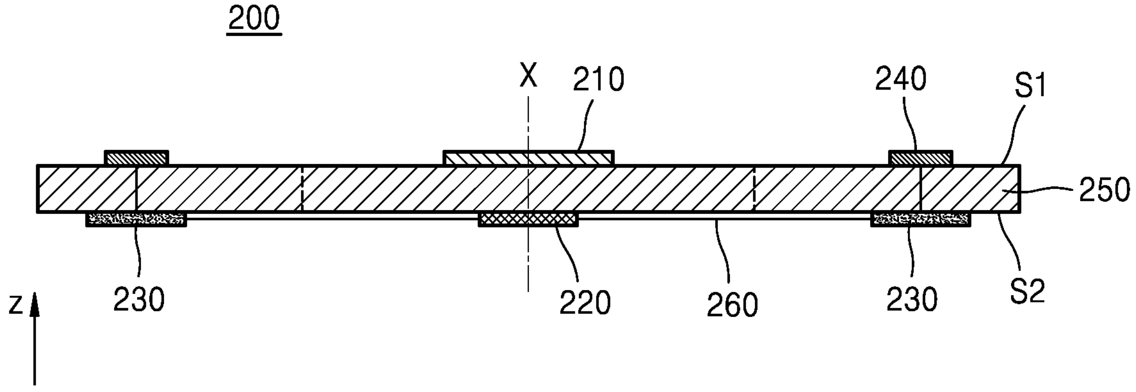
FIG. 3C is a cross-sectional view of the antenna module of FIG. 3A, taken along line A-A' according to an embodiment of the disclosure.

FIG. 3C is a cross-sectional view of the antenna module of FIG. 3A, taken along line A-A' according to an embodiment of the disclosure.

Referring to FIGS. 3A to 3C, according to an embodiment of the disclosure, the antenna module 200 may include a PCB 250.

The PCB 250 may include a plurality of conductive layers and a plurality of non-conductive layers alternately stacked with the plurality of conductive layers. The PCB 250 may provide, by using lines and conductive vias formed in the conductive layers, electrical connection between various electronic components arranged inside and/or outside the PCB 250. The PCB 250 may include a rigid PCB (RPCB), a flexible PCB (FPCB), or a rigid flexible PCB (RFPCB).

The PCB 250 may include an intermediate area 252 and an edge area 254 surrounding the intermediate area 252. The IFIC 220 may be arranged in the intermediate area 252, and the plurality of RFICs 230 and the plurality of antenna arrays 240 may be arranged in the edge area 254.

Each of the antenna array 240 may include a plurality of antenna elements 242 arranged to form a directional beam. As illustrated, the antenna elements 242 may be formed on a first surface S1 (e.g., a front surface) of the PCB 250. For example, the antenna arrays 240 is arranged in the edge area 254 of the first surface S1 of the PCB 250. According to an embodiment of the disclosure, the antenna arrays 240 may be formed in the PCB 250. According to embodiments of the disclosure, the antenna arrays 240 may include a plurality of antenna arrays (e.g., dipole antenna arrays and/or patch antenna arrays) of the same or different shapes or types.

The plurality of antenna arrays 240 may be arranged to be apart from each other by a predetermined distance, with respect to a center X of the PCB 250. The plurality of antenna arrays 240 may be arranged to be rotationally symmetrical with respect to the center X of the PCB 250. For example, when there are three antenna arrays 240, the antenna arrays 240 is arranged to be apart from each other by 120 degrees, with respect to the center X of the PCB 250. Thus, the three antenna arrays 240 may perform omni-directional beamforming.

The edge area 254 of the PCB 250 may be divided into a plurality of sub-areas 254-1 to correspond to the plurality of antenna arrays 240, and the plurality of sub-areas 254-1 may be arranged to be apart from each other. Alternatively, a flexible dielectric material may be arranged between the plurality of sub-areas 254-1. A conductive material may not be arranged between the plurality of sub-areas 254-1 so as to prevent coupling between the antenna arrays 240.

Each of the plurality of RFICs 230 may be arranged on a second surface S2 (e.g., a rear surface) facing the first surface S1 of the PCB 250, on which the antenna arrays 240 are arranged. The RFICs 230 may be arranged in the edge area 254 of the second surface S2 of the PCB 250.

Each RFIC 230 may be arranged on the sub-area 254-1 on which the corresponding antenna array 240 is arranged. When the antenna arrays 240 are arranged on the first surface S1 of the sub-areas 254-1, the RFICs 230 may be arranged on the second surface S2 of the sub-areas 254-1. The RFICs 230 and the antenna arrays 240 respectively corresponding to each other in a thickness direction (a z axis) of the PCB 250 may overlap each other. A center X of the RFICs 230 and a center X of the antenna arrays 240 may overlap each other in the thickness direction (the z axis) of the PCB 250. Thus, a length of the connection line 260 between the RFIC 230 and the antenna array 240 may be reduced, and a loss (e.g., an offset) due to the connection line 260 may be decreased. Therefore, the quality and the speed of communication of the antenna module 200 may be increased.

The IFIC 220 may be arranged on the PCB 250 to be apart from the plurality of antenna arrays 240 and the plurality of RFICs 230. The IFIC 220 may be arranged on the second surface S2 of the PCB 250. The IFIC 220 may be arranged in the intermediate area 252 of the second surface S2 of the PCB 250.

The IFIC 220 may be arranged to be apart from each of the plurality of RFICs 230 by the same distance. The expression "the same" may denote not only that things are mathematically the same as each other, but also that things are substantially the same as each other within a common error range, for example, 5%. The IFIC 220 and each of the plurality of RFICs 230 may be electrically connected to each other through the connection line 260. The connection line 260 may include a coaxial cable connector, a board-to-board connector, an interposer, or an FPCB. Although it is illustrated in the drawing that the connection line 260 of the IFIC 220 and the plurality of RFICs 230 is a coaxial cable, the connection line 260 of the IFIC 220 and the plurality of RFICs 230 is not limited thereto. The IFIC 220 and the plurality of RFICs 230 may be electrically connected to each other via a conductive line equipped in the PCB 250.

Because the distance from the IFIC 220 and each of the plurality of RFICs 230 is the same, the IFIC 220 and each of the plurality of RFICs 230 may be connected with each other by the connection line 260 having the same length. Thus, the IFIC 220 may transmit or receive an IF signal having the same phase to or from the plurality of RFICs 230. Because the distance from the IFIC 220 and each of the plurality of RFICs 230 is the same, the IFIC 220 and each of the plurality of RFICs 230 may be connected with each other by the connection line 260 having a shortest length, and at least a portion of the connection line 260 may become a straight area. The straight area may be greater than or equal to 50% of the entire area of the connection line 260. Because the IFIC 220 and the plurality of RFICs 230 may be connected with each other by the connection line 260 having a short length, a loss of the IF signal, due to the length of the connection line 260, that is, an insertion loss, may be reduced.

The number of connection lines 260 may be determined according to a polarization characteristic of an electromagnetic wave radiated from the antenna arrays 240. For example, when the electromagnetic wave radiated from the antenna arrays 240 includes dual polarization, the connection line 260 connecting the IFIC 220 with each of the RFICs 230 may be twice the number of antenna elements 242 included in the corresponding antenna array 240.

The modem 210 may be electrically connected to the IFIC 220. The modem 210 may transmit a transmission signal to the IFIC 220 or receive a reception signal from the IFIC 220. The modem 210 may include a CP. The CP may support establishment of a communication channel of a band to be used for radio communication, and legacy network communication through the established communication channel. The network 294 described above may be a 5G network defined in the third generation partnership project (3GPP).

The modem 210 may be electrically connected to the IFIC 220 and may be arranged to be apart from the IFIC 220. For example, the modem 210 is arranged on the first surface S1 of the PCB 250. For example, the modem 210 may be arranged in the intermediate area 252 of the first surface S1 of the PCB 250.

Figure 4:
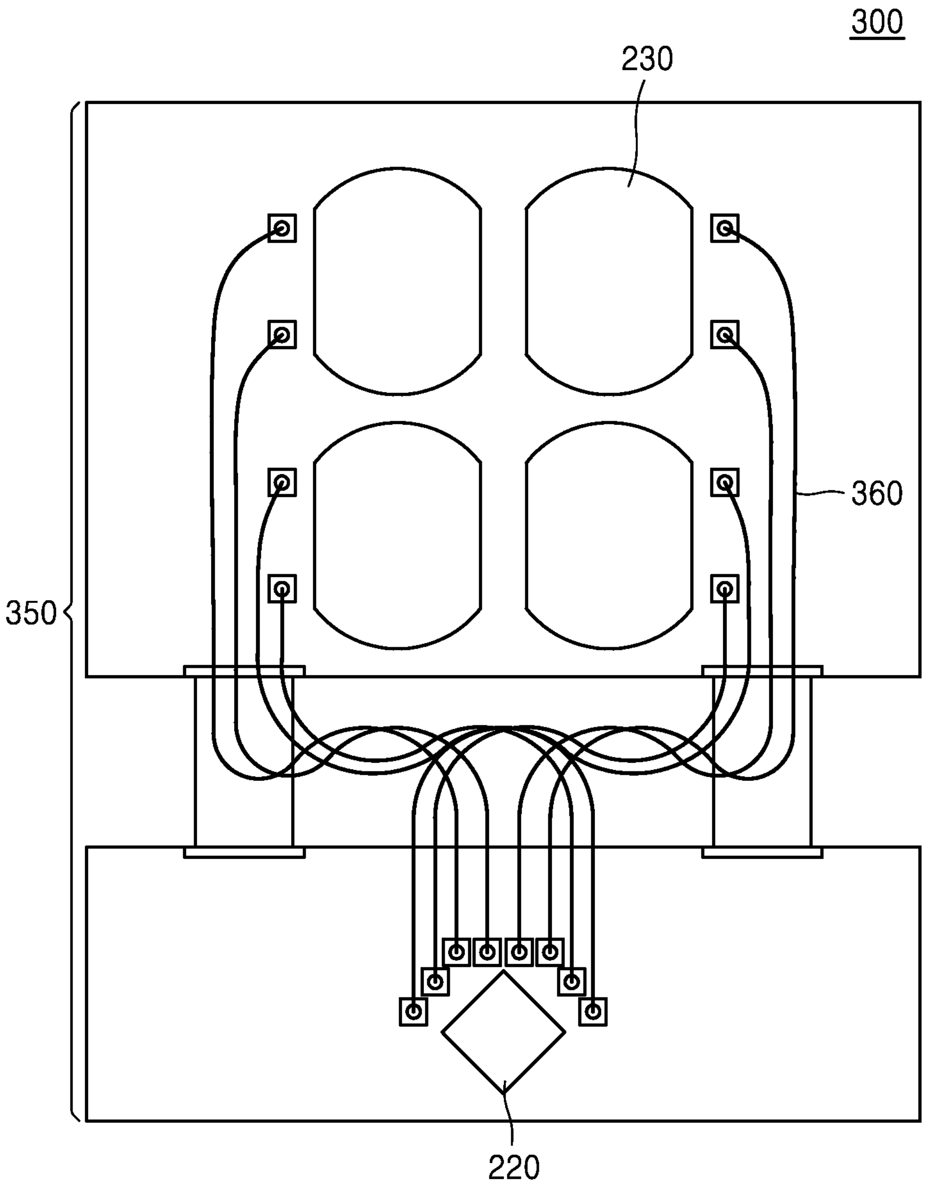
FIG. 4 is a diagram showing a connection relationship between a plurality of radio frequency integrated circuits (RFICs) and one intermediate frequency integrated circuit (IFIC), according to an embodiment of the disclosure.

FIG. 4 is a diagram showing a connection relationship between a plurality of RFICs and one IFIC, according to an embodiment of the disclosure.

Referring to FIG. 4, a PCB 350, on which one IFIC 220 and four RFICs 230 may be arranged, may be divided into an area in which the four RFICs 230 are arranged and an area in which the one IFIC 220 is arranged, wherein the area in which the four RFICs 230 are arranged and the area in which the one IFIC 220 is arranged are arranged to be up and down with respect to each other. A length of a connection line 360 connecting the one IFIC 220 and the four RFICs 230 may be determined by a distance that is the longest from among distances between each of the four RFICs 230 and the one IFIC 220. For example, the connection line 360 having a length that is the same as a length of the connection line 360 connecting the longest distance of the distances between the RFICs 230 and the IFIC 220 connects the remaining RFICs 230 and the IFIC 220. Thus, the connection lines 360 may be arranged on the PCB 350 to form a curved line and may seldom have a straight area. An average length of the connection lines 260 may be about 67 mm.

Figure 5:
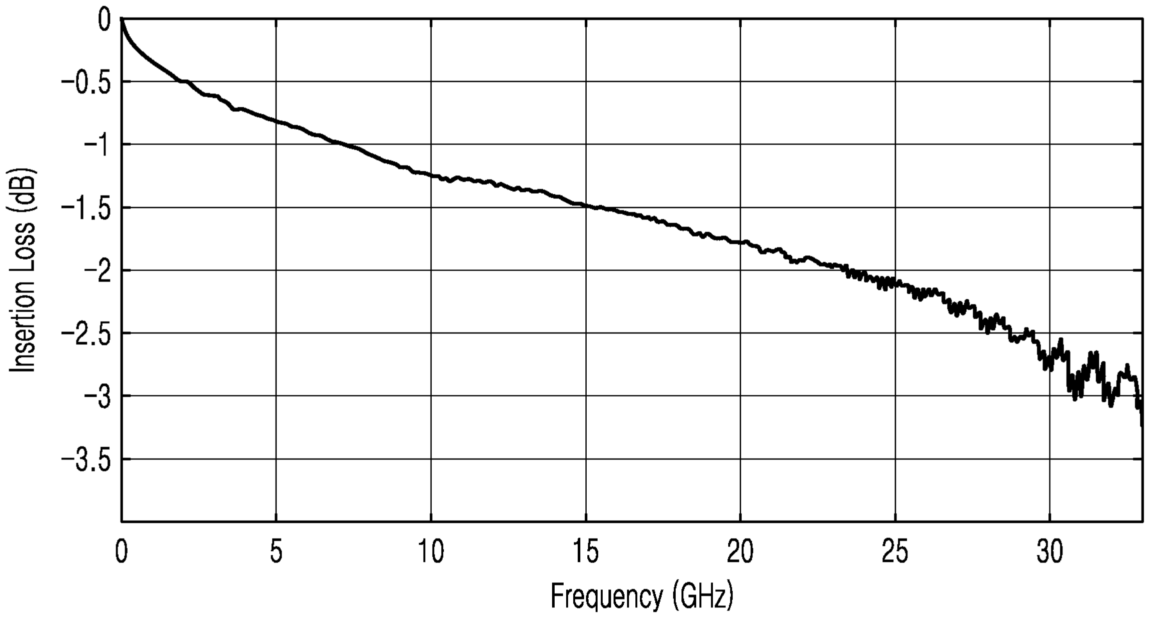
FIG. 5 shows a result of measuring an insertion loss of an antenna module of FIG. 4 according to an embodiment of the disclosure.

FIG. 5 shows a result of measuring an insertion loss of the antenna module 200 of FIG. 4 according to an embodiment of the disclosure.

Referring to FIG. 5, it is identified that the insertion loss is high as about 1.25 dB in a band of about 10 GHz, which is an IF band.

Figure 6:
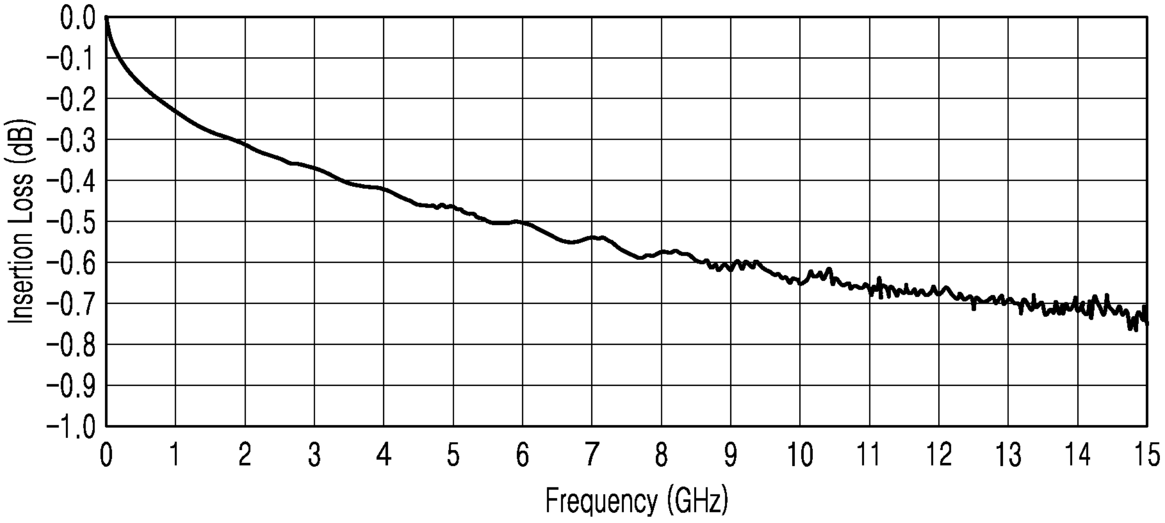
FIG. 6 shows a result of measuring an insertion loss of an antenna module according to an embodiment of the disclosure.

FIG. 6 shows a result of measuring an insertion loss of the antenna module 200 according to an embodiment of the disclosure. In the antenna module 200 according to an embodiment of the disclosure, an average length of the connection lines 260 connecting the plurality of RFICs 230 and the IFIC 220 may decrease to about 11 mm.

Referring to FIG. 6, it is identified that the insertion loss is reduced to about 0.65 dB in the band of about 10 GHz, which is the IF band.

Figure 7:
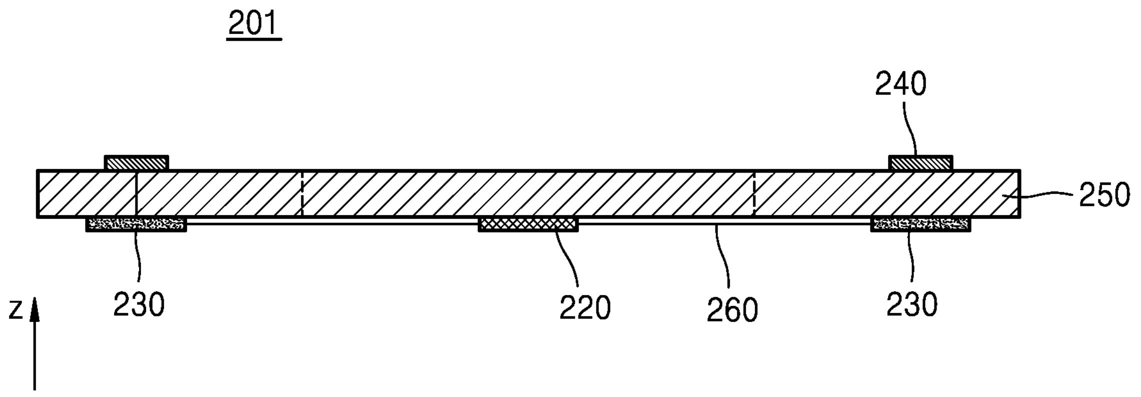
FIG. 7 is a diagram of an antenna module according to an embodiment of the disclosure.

FIG. 7 is a diagram of an antenna module 201 according to an embodiment of the disclosure.

Referring to FIG. 7, in comparison with FIG. 3C, the modem 210 may not be arranged on the PCB 250. The modem 210 may be arranged on another PCB by being connected to the IFIC 220 through a connection line (not shown), such as a coaxial cable.

Figure 8:
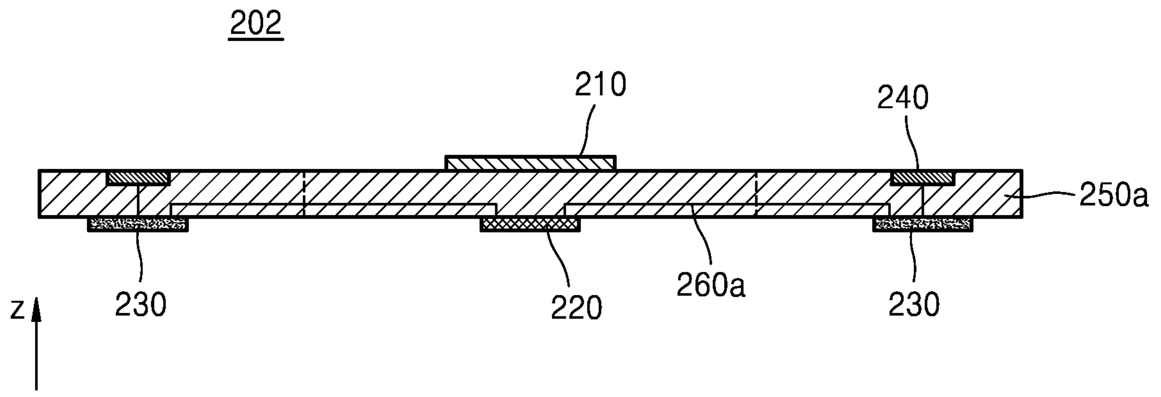
FIG. 8 is a diagram of an antenna module, in which a connection line is equipped in a printed circuit board (PCB), according to an embodiment of the disclosure.

FIG. 8 is a diagram of an antenna module 202 in which a connection line 260*a* is equipped in a PCB 250*a*, according to an embodiment of the disclosure.

Referring to FIG. 8, in comparison with FIG. 3C, the conductive lines 260*a* equipped in the PCB 250*a* may connect the IFIC 220 with each of the plurality of RFICs 230. The plurality of conductive lines 260*a* may include a straight area, and a length of the straight area may be greater than or equal to 50% of the entire length of the conductive lines 260*a*. The plurality of conductive lines 260*a* may not overlap each other in the thickness direction (the z axis) of the PCB 250 and may have the same length as each other. Thus, the length of the conductive lines 260*a* connecting the IFIC 220 with the plurality of RFICs 230 may be minimized.

Figure 9:
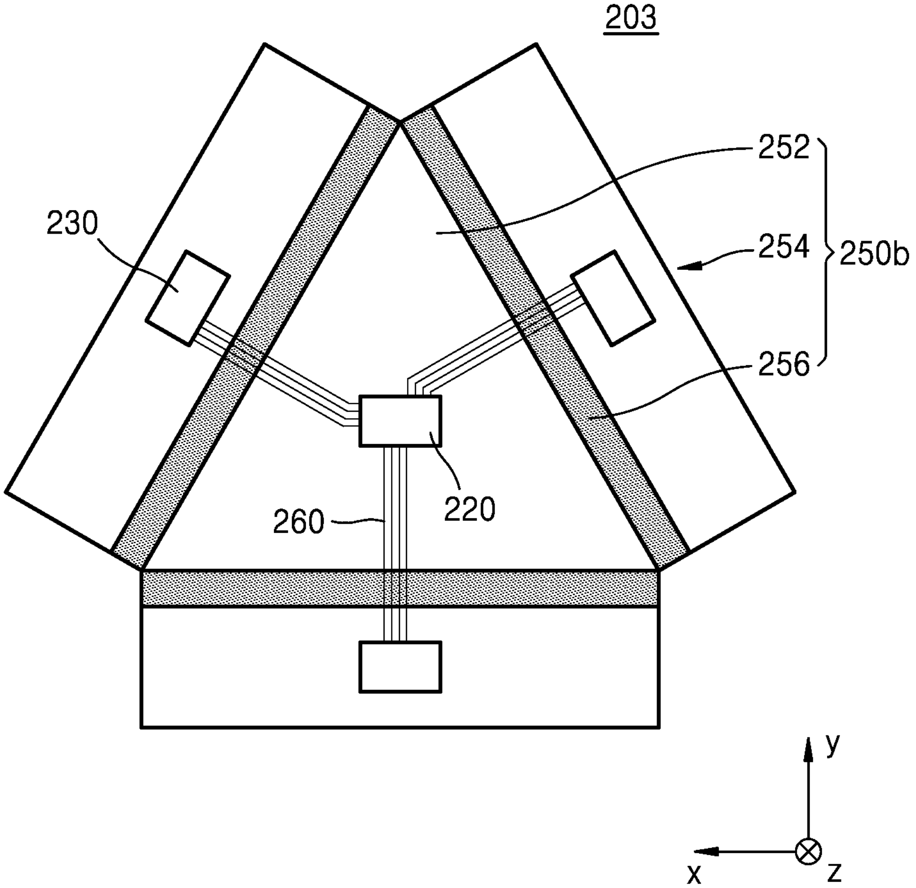
FIG. 9 is a diagram of an antenna module including a rigid flexible PCB (RFPCB), according to an embodiment of the disclosure.

FIG. 9 is a diagram of an antenna module 203 including an RFPCB, according to an embodiment of the disclosure.

Referring to FIG. 9, a PCB 250*b* may be an RFPCB. The PCB 250*b* may include an intermediate area 252, an edge area 254, and a boundary area 256 connecting the intermediate area 252 with the edge area 254. The IFIC 220 may be arranged in the intermediate area 252, and the antenna arrays 240 and the RFICs 230 may be arranged in the edge area 254. Also, the intermediate area 252 and the boundary area 256 may be rigid areas, and the boundary area 256 may be a flexible area.

The antenna arrays 240, the RFICs 230, and the IFIC 220 may be arranged in the rigid area of the PCB 250*b*, and thus, may be more stably fixed on the PCB 250*b*. The boundary area 256 between the edge area 254 and the intermediate area 252 may be flexible, and thus, the antenna module 203 may be easily transformed according to a shape of the vehicle 100 on which the antenna module 203 is mounted.

Figure 10A:
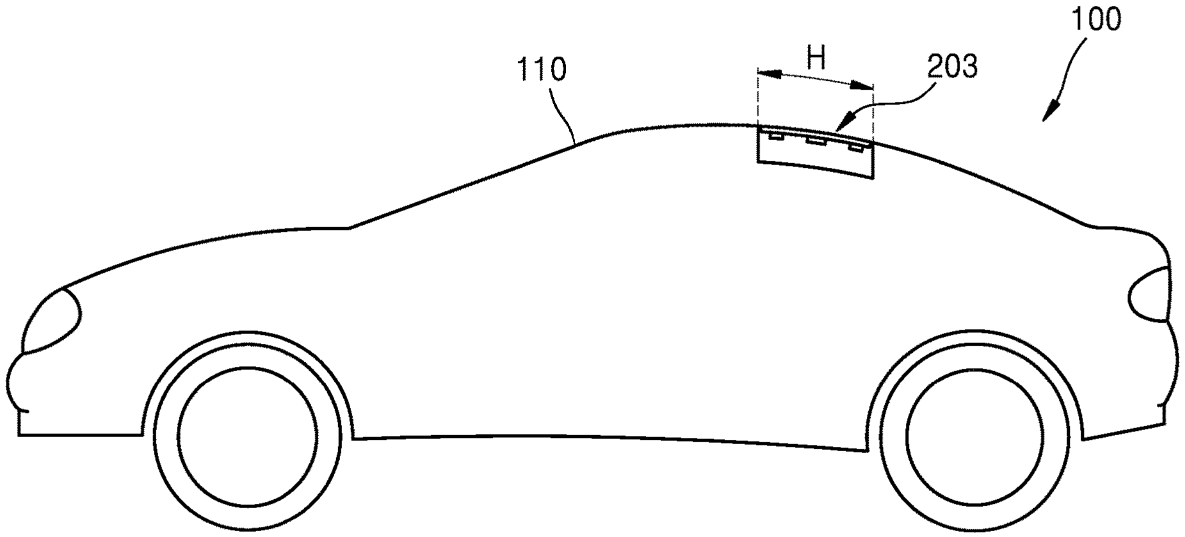
FIG. 10A is a diagram showing an example of a state in which an antenna module is arranged in a vehicle, according to an embodiment of the disclosure.
Figure 10B:
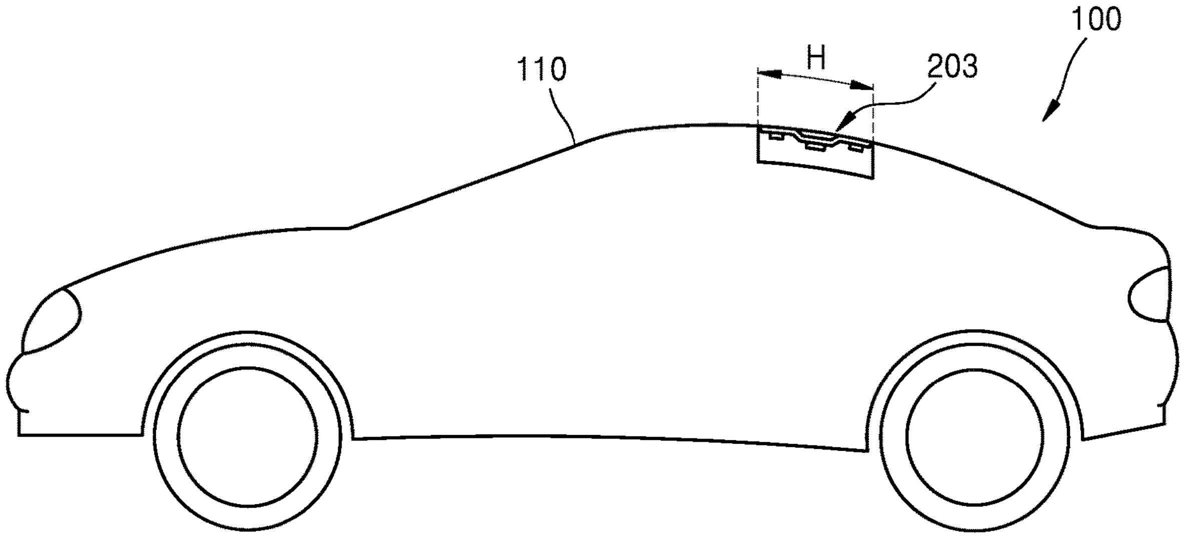
FIG. 10B is a diagram showing an example of a state in which an antenna module is arranged in a vehicle, according to an embodiment of the disclosure.
Figure 10C:
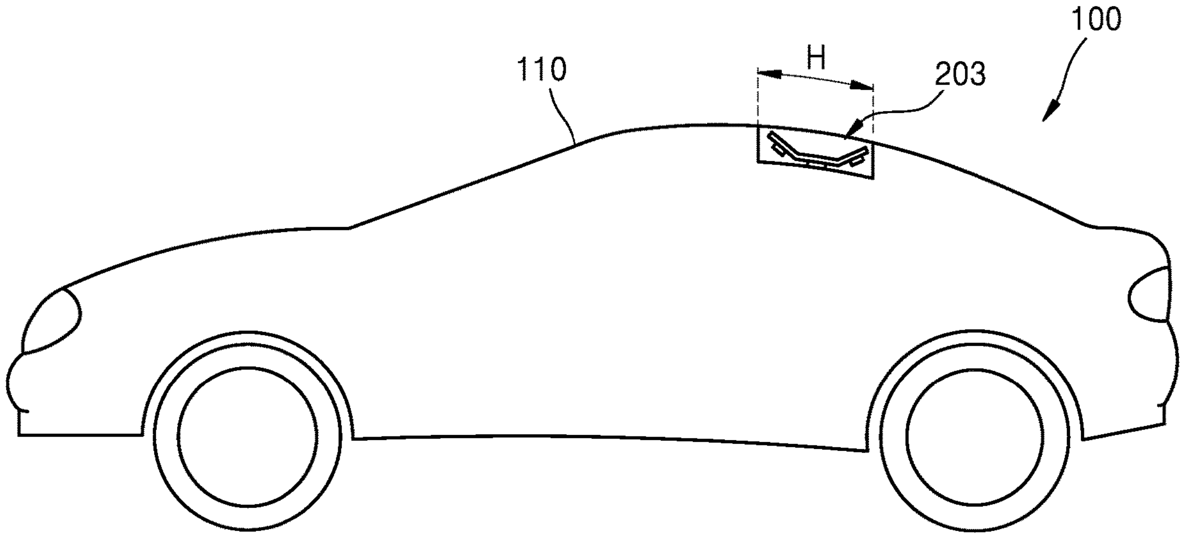
FIG. 10C is a diagram showing an example of a state in which an antenna module is arranged in a vehicle, according to an embodiment of the disclosure.

FIGS. 10A, 10B, and 10C are diagrams showing an example state in which an antenna module including the RFPCB is arranged in a vehicle according to various embodiments of the disclosure.

Referring to FIG. 10A, the antenna module 203 according to an embodiment of the disclosure may be integrally arranged with the upper panel 110 of the vehicle 100. The boundary area 256 of the PCB 250*b* may form a curved line to correspond to the upper panel 110 of the antenna module 203, and thus, the exterior shape of the vehicle 100 may not be changed due to the antenna module 203.

Referring to FIG. 10B, the antenna module 203 according to an embodiment of the disclosure may be mounted on the vehicle 100 such that the edge area 254 of the PCB 250*b* may be arranged to be exposed to the outside of the vehicle 100, and the intermediate area 252 may be arranged to be inside of the vehicle 100. By arranging the antenna module 203 to be exposed to the outside of the vehicle 100, the communication efficiency of the antenna module 203 may be increased, and by arranging the intermediate area 252 in the vehicle 100, the effects of external shocks on the IFIC 220 or the modem 210 may be reduced.

Referring to FIG. 10C, the antenna module 203 may be buried in the vehicle 100. Beamforming may be performed in a state in which the edge area 254 of the PCB 250*b* is inclined by a predetermined angle with respect to the intermediate area 252, and thus, an area occupied by antenna module 200 in the vehicle 100 may be reduced.

A degree of inclination between the intermediate area 252 and the edge area 254 may be fixed or variable.

Figure 11:
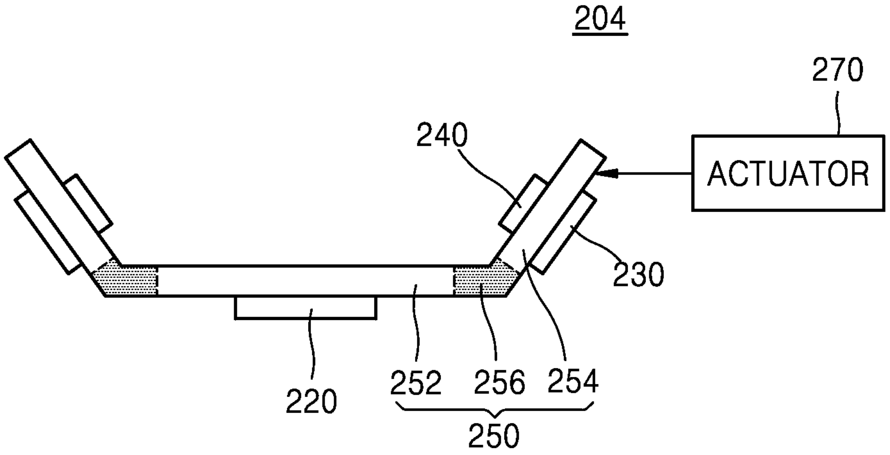
FIG. 11 is a diagram of an antenna module further including an actuator configured to adjust a degree of inclination of an antenna array, according to an embodiment of the disclosure.

FIG. 11 is a diagram of an antenna module further including an actuator configured to adjust a degree of inclination of an antenna arrays, according to an embodiment of the disclosure.

Referring to FIG. 11, the antenna module 204 may further include the actuator 270 configured to adjust the degree of inclination between the intermediate area 252 and the edge area 254. The actuator 270 may include a hinge, and the like. When mounting the antenna module 204 on the vehicle 100, the actuator 270 may be fixed, after adjusting the degree of inclination between the intermediate area 252 and the edge area 254. However, the disclosure is not limited thereto. According to a communication state, the degree of inclination between the intermediate area 252 and the edge area 254 may vary, under control by a processor (not shown). That is, a shape of the boundary area 256 may be transformed.

It is described above that the IFIC 220 may be arranged in the intermediate area 252 of a triangular shape. However, the IFIC 220 is not limited thereto. The intermediate area 252 in which the IFIC 220 may be arranged may have a regular polygonal shape, such as a square shape, a regular pentagonal shape, and the like, or may have a circular shape.

Figure 12:
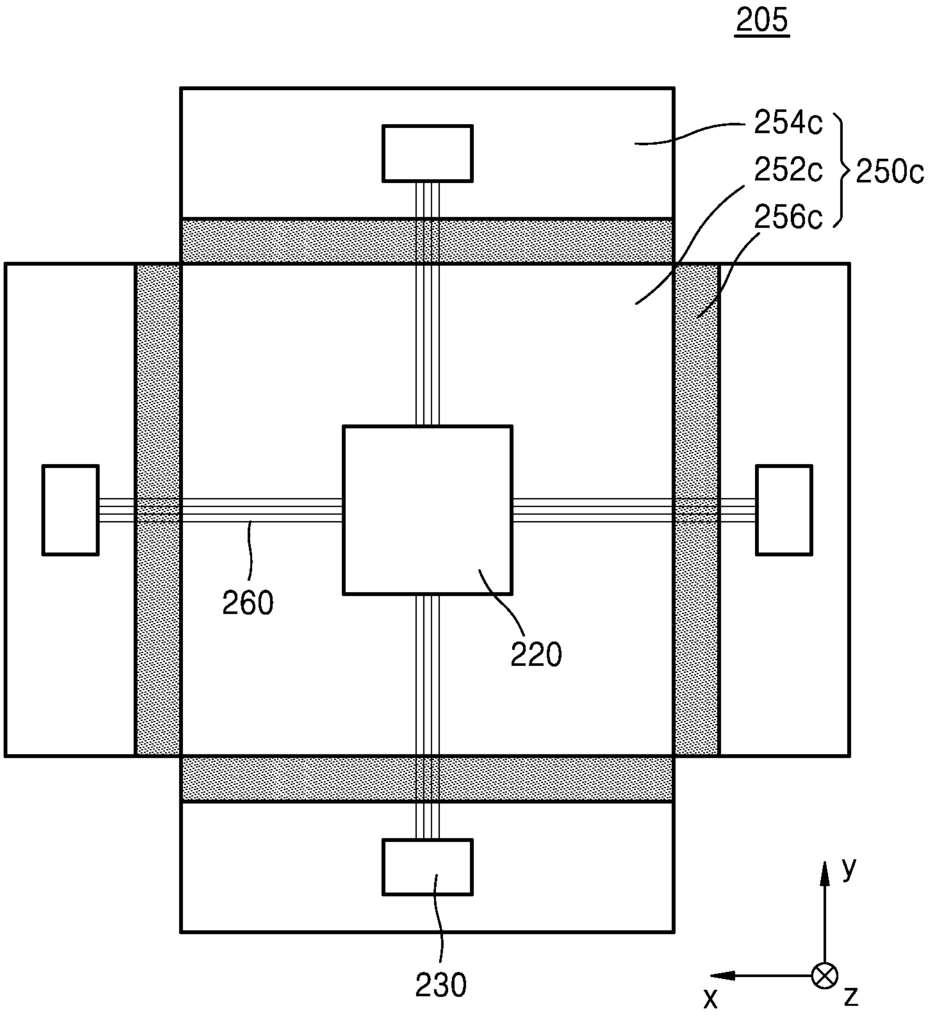
FIG. 12 is a diagram of an antenna module having an intermediate area of a quadrangular shape, according to an embodiment of the disclosure.

FIG. 12 is a diagram of an antenna module having an intermediate area of a square shape, according to an embodiment of the disclosure.

Referring to FIG. 12, an antenna module 205 may include a PCB 250*c* including an intermediate area 252*c* having the square shape and an edge area 254*c*. The PCB 250*c* may further include a boundary area 256*c* connecting the intermediate area 252*c* and the edge area 254*c*. The intermediate area 252*c* and the edge area 254*c* may be rigid areas, and the boundary area 256*c* may be a flexible area.

The edge area 254*c* may include four sub-areas surrounding the intermediate area 252*c*, and the four sub-areas may be arranged to be apart from each other. The four sub-areas may be symmetrically arranged with respect to a center of the PCB 250*c*. For example, the four sub-areas may be rotationally symmetrically arranged with respect to the center of the PCB 250*c*.

An antenna array (not shown) may be arranged on a first surface (e.g., a front surface) of each of the sub-areas, and the RFIC 230 electrically connected to the antenna array may be arranged on a second surface (e.g., a rear surface) of each of the sub-areas. A center of the antenna array and a center of the RFIC 230 may overlap each other in a thickness direction (a z axis) of the PCB 250*c*.

The IFIC 220 may be arranged on the second surface of the intermediate area 252*c* of the PCB 250*c*. Distances between the IFIC 220 and each of the four RFICs 230 may be the same as each other. Also, the four RFICs 230 may be symmetrically arranged with respect to the IFIC 220. For example, the four RFICs 230 may be rotationally symmetrically arranged with respect to the IFIC 220.

Figure 13:
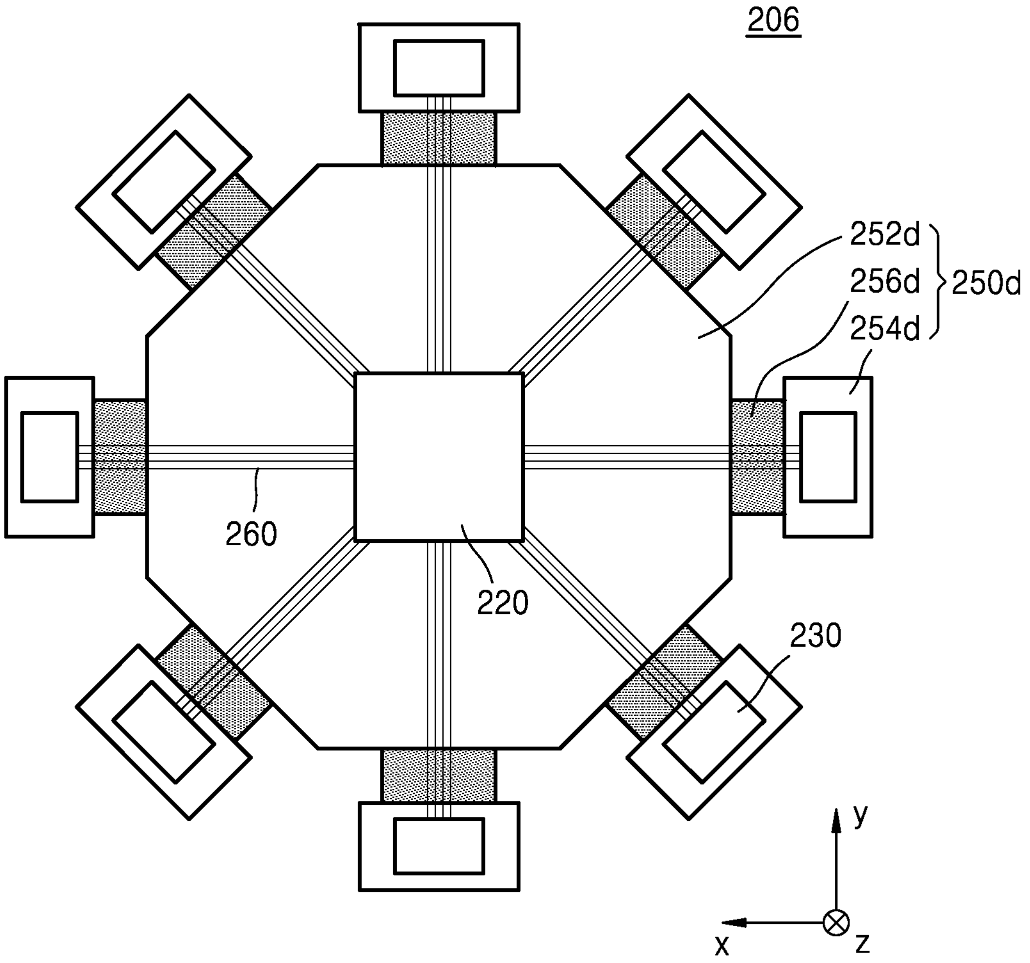
FIG. 13 is a diagram of an antenna module having an intermediate area of an octagonal shape, according to an embodiment of the disclosure.

FIG. 13 is a diagram of an antenna module having an intermediate area of an octagonal shape, according to an embodiment of the disclosure.

Referring to FIG. 13, an antenna module 206 may include a PCB 250*d* including an intermediate area 252*d* having the octagonal shape and an edge area 254*d*. The PCB 250*d* may further include a boundary area 256*d* connecting the intermediate area 252*d* and the edge area 254*d*. The intermediate area 252*d* and the edge area 254*d* may be rigid areas, and the boundary area 256*d* may be a flexible area.

The edge area 254*d* may include eight sub-areas surrounding the intermediate area 252*d*, and the eight sub-areas may be arranged to be apart from each other. The eight sub-areas may be symmetrically arranged with respect to a center of the PCB 250*d*. For example, the eight sub-areas are rotationally symmetrically arranged with respect to the center of the PCB 250*d*.

An antenna array (not shown) may be arranged on a first surface (e.g., a front surface) of each of the sub-areas, and the RFIC 230 electrically connected to the antenna array may be arranged on a second surface (e.g., a rear surface) of each of the sub-areas. A center of the antenna array and a center of the RFIC 230 may overlap each other in a thickness direction (a z axis) of the PCB 250*d*.

The IFIC 220 may be arranged on the second surface of the intermediate area 252*d* of the PCB 250*d*. Distances between the IFIC 220 and each of the eight RFICs 230 may be the same as each other. Also, the eight RFICs 230 may be symmetrically arranged with respect to the IFIC 220. For example, the eight RFICs 230 may be rotationally symmetrically arranged with respect to the IFIC 220.

The number of antenna arrays and the number of RFICs 230 may vary according to a regular polygonal shape of the intermediate area 252*d*. That is, the number of antenna arrays and the number of RFICs 230 may be less than or equal to the number of segments of the regular polygon.

As the number of antenna arrays and the number of RFICs increase, the antenna module may relatively more precisely perform beamforming on a signal. The antenna module according to an embodiment of the disclosure may be implemented not only in a vehicle, but also in an airplane, a battleship, and the like.

Figure 14:
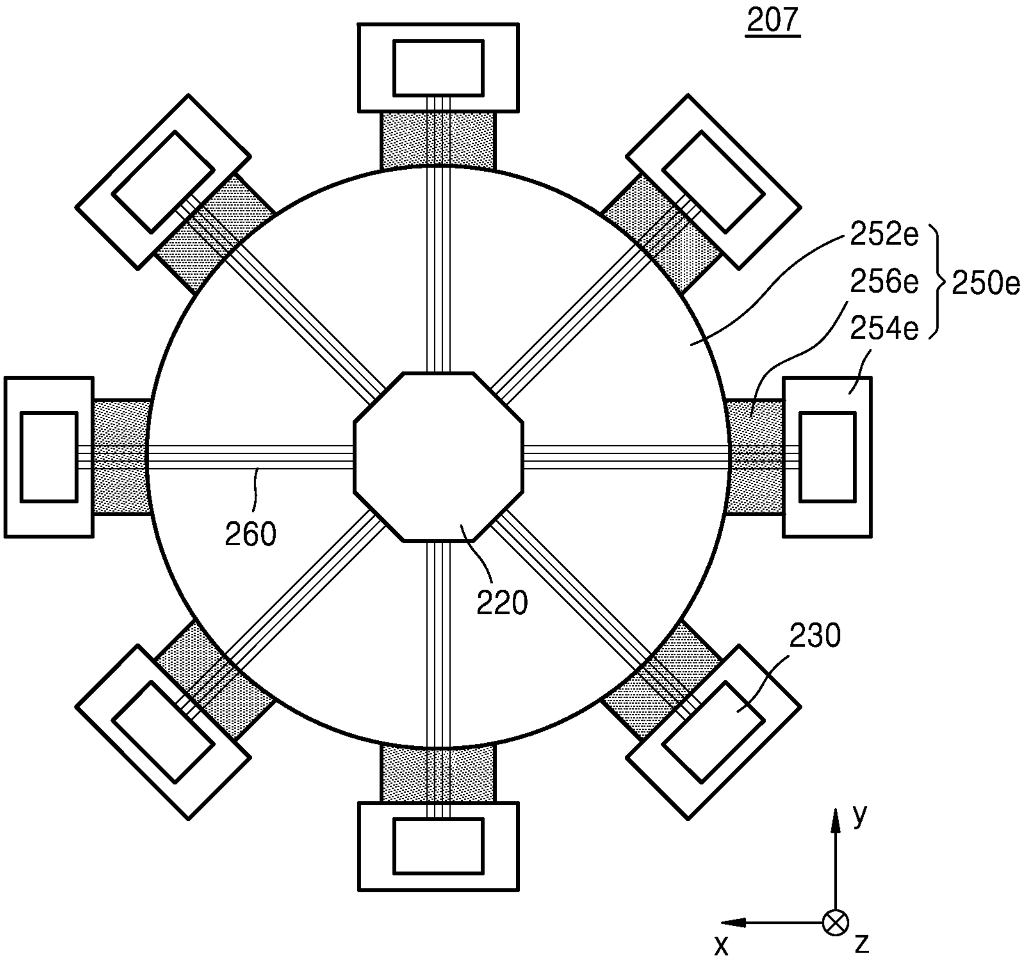
FIG. 14 is a diagram of an antenna module having an intermediate area of a circular shape, according to an embodiment of the disclosure.

FIG. 14 is a diagram of an antenna module having an intermediate area 252*e* of a circular shape, according to an embodiment of the disclosure.

Referring to FIG. 14, in antenna module 207, the intermediate area 252*e* of a PCB 250*e* may have the circular shape. An edge area 254*e* may include a plurality of sub-areas arranged to be apart from each other, and the plurality of sub-areas may at least partially surround the intermediate area 252*e*. The plurality of sub-areas may have a square shape, but are not limited thereto. An antenna array (not shown) and the RFIC 230 may be arranged in each of the sub-areas, and the IFIC 220 may be arranged in the intermediate area 252*e*.

When the intermediate area 252*e* has the circular shape, the number of sub-areas may be easily differently designed. For example, the edge area 254*e* may be divided into eight sub-areas, five sub-areas, and the like.

Figure 15:
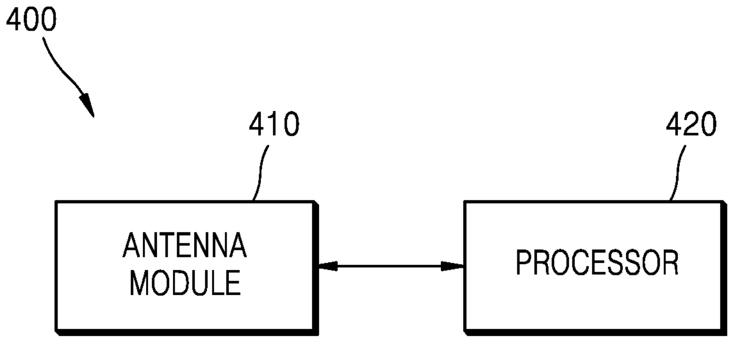
FIG. 15 is a block diagram of an antenna device for a vehicle, according to an embodiment of the disclosure.

FIG. 15 is a block diagram of an antenna device for a vehicle, according to an embodiment of the disclosure. The antenna device illustrated in FIG. 15 may be mounted on an area inside or outside the vehicle 100.

Referring to FIG. 15, an antenna device 400 for a vehicle according to an embodiment of the disclosure may be an antenna device mounted on the vehicle 100 for wireless communication and may transmit or receive electromagnetic waves through the antenna module described above. A frequency band used for wireless communication may vary according to a communication standard or a communication type that is desired to be used, and the antenna module according to an embodiment of the disclosure may transmit or receive a radio signal of an mmWave band.

Also, the antenna device 400 for a vehicle according to an embodiment of the disclosure may be integrally formed with another antenna module (not shown) for a vehicle. The antenna module for a vehicle may be referred to as a telematics control unit (TCU). The TCU may be a component configured to control data transmission or reception in the vehicle 100 through the wireless communication and may take charge of communication between the vehicle 100 and an external electronic device (e.g., a server, a mobile device, and the like).

Referring to FIG. 15, the antenna device 400 for a vehicle may include an antenna module 410 and a processor 420. The antenna module 410 may include the antenna module 200 described above.

The processor 420 may perform the operations according to the embodiment of the disclosure by executing one or more instructions. That is, the processor 420 may execute the one or more instructions to control intended operations to be performed.

For example, the processor 420 may adjust a phase of at least one electromagnetic wave signal output from the antenna module 410 to obtain information from an external device. The processor 420 may control driving of the vehicle 100 based on the obtained information. In addition, the processor 420 may control the antenna module 410 to output a predetermined beam based on driving information of the vehicle 100.

The processor 420 may include an internal memory (not shown) and at least one processor (not shown) configured to execute at least one stored program. The internal memory of the processor 420 may store one or more instructions. Also, the processor 420 may execute at least one of the one or more instructions stored in the internal memory to perform a predetermined operation.

In detail, the processor 420 may include random-access memory (RAM) (not shown) used to store a signal or data input from the outside or used as a storage area corresponding to various operations performed by the antenna module 410, read-only memory (ROM) (not shown) in which control programs and/or a plurality of instructions for controlling the antenna module 410 are stored, and at least one processor (not shown).

Alternatively, the processor 420 may be realized as a system on chip (SoC) in which a core (not shown) and a graphics processing unit (GPU) (not shown) are combined together. Alternatively, the processor 420 may include a multi-core including more cores than a single-core. For example, the processor 420 may include a dual core, a triple core, a quad core, a hexa core, an octa core, a deca core, a dodeca core, a hexadecimal core, or the like.

Also, the processor 420 may include components (e.g., an application processor (AP), a memory, and the like) for realizing a hardware platform, and components (e.g., an operation system (OS) program, software (automotive safety software) for controlling a phase of an electromagnetic wave signal output from the antenna array 240, an application, and the like) for realizing a software platform.

Also, at least one of the operations performed by the processor 420 may be performed by using an artificial intelligence (AI) technique.

Figure 16:
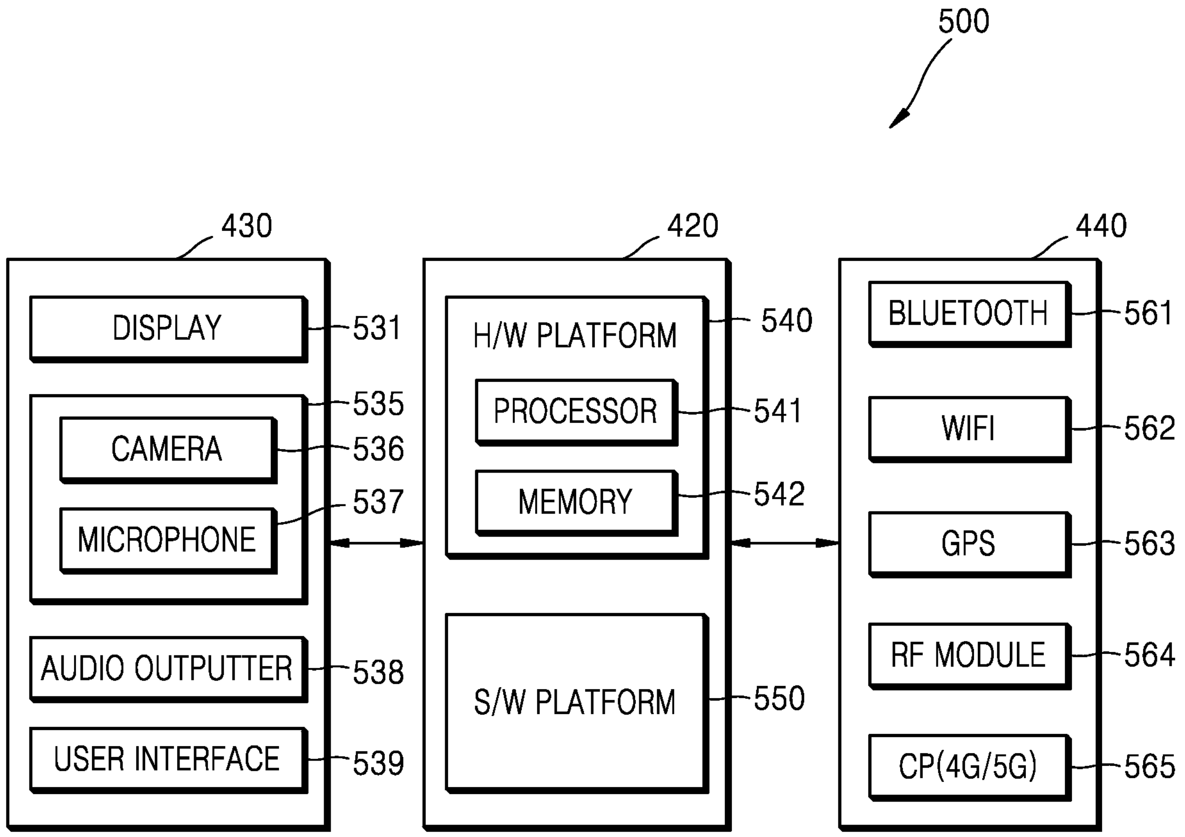
FIG. 16 is a block diagram of an electronic device for a vehicle, the electronic device for a vehicle including the antenna device for a vehicle of FIG. 15 according to an embodiment of the disclosure.

FIG. 16 is a block diagram of an electronic device for a vehicle, the electronic device for a vehicle including the antenna device for a vehicle of FIG. 15 according to an embodiment of the disclosure.

Referring to FIG. 16, an electronic device 500 for a vehicle may include the antenna device 400 for a vehicle described with reference to FIG. 15. Also, the electronic device 500 for a vehicle may indicate a computing device which may be integrally formed with the antenna module 410 for a vehicle and mounted in the vehicle 100. Therefore, for describing the electronic device 500 for a vehicle, the same aspects as the antenna module 410 for a vehicle are not repeatedly described. Also, with respect to the electronic device 500 for a vehicle illustrated in FIG. 16, the same elements as described with reference to FIG. 15 are described by using the same reference numerals and terms.

Referring again to FIG. 16, the electronic device 500 for a vehicle may include the processor 420, an inputter and an outputter 430, and a communicator 440. In detail, the electronic device 500 for a vehicle may include the antenna module 410 for a vehicle, and the antenna module 410 for a vehicle may be integrally formed with the communicator 440, which is a TCU performing communication in the vehicle 100.

Also, the electronic device 500 for a vehicle may be an electronic device for realizing an in-vehicle infotainment (IVI) technology. For example, the electronic device 500 for a vehicle may provide services, information, and/or content tailored for a predetermined user, based on user's location information. In detail, the electronic device 500 for a vehicle may perform communication between the vehicle 100 and an external device, to obtain information required for driving or using of the vehicle 100. Alternatively, the electronic device 500 for a vehicle may perform communication between the vehicle 100 and an external device, to provide services, information, and/or content to a user.

The processor 420 and the inputter and the outputter 430 together included in the electronic device 500 for a vehicle may be together referred to as an IVI head unit. Also, the electronic device 500 for a vehicle may be arranged in the middle of a central front portion of the vehicle 100, between a driver's seat and an assistant's seat. In this case, an array antenna included in the electronic device 500 for a vehicle may be mounted to be apart from other components included in the electronic device 500 for a vehicle and may be connected with the other components of the electronic device 500 for a vehicle through a wired communication interface, such as a wired cable, and the like, or through a wireless communication interface.

Also, the communicator 440 may be referred to as a TCU.

The TCU may be a component configured to control data transmission or reception in the vehicle 100 and may be in charge of communication between the vehicle 100 and an external electronic device (e.g., a server, a mobile device, and the like).

The processor 420 may include components 541 (e.g., an AP, a memory, and the like) for realizing a hardware platform and components 550 (e.g., an OS program, automotive safety software, an application, and the like) for realizing a software platform.

In detail, the components 541 for realizing the hardware platform may include at least one AP 541 and a memory 542. A case where the memory 542 is included in the processor 420 is described as an example. Also, the memory 542 may not be included in the processor 420 and may be included in the electronic device 500 for a vehicle as a separate component.

Also, the components 541 for realizing the hardware platform may further include a universal serial bus (USB) module (not shown), an FM/DMB tuner (not shown), and the like. The USB module may read data in an inserted USB, by including a USB insertion portion (not shown). Also, the FM/DBM tuner may selectively receive FM/DMB broadcasting signals. In detail, the FM/DMB tuner may tune and select only a frequency of a channel desired to be received by the electronic device 500 for a vehicle from among a lot of electromagnetic wave elements, through amplification, mixing, resonance, and the like, performed on wirelessly received broadcasting signals. The broadcasting signals received by the FM/DMB tuner may include audio, video, and additional information (e.g., an electronic program guide (EPG)).

The components 550 for realizing the software platform may include an OS program, automotive safety software, an application, and the like. The OS program may include a QNX, Linux, or Android-based OS program.

The inputter and the outputter 430 may be a component configured to provide data to a user or receive a request of the user and may include at least one of a display 531, a camera module 535, an audio outputter 538, or a user interface 539.

The camera module 535 may be a component configured to obtain image and/or sound data and may include a camera 536 and a microphone 537. Also, the camera module 535 may include a speaker (not shown) for outputting an operation sound of the camera 536, and the like. Also, when the camera module 535 does not include an additional speaker (not shown), the operation sound, and the like of the camera 536 may be output through the audio outputter 538.

For example, the camera module 535 operates as a detection sensor for recognizing a gesture or a voice of a user.

In detail, the camera 536 may receive an image (e.g., consecutive frames) corresponding to a motion of the user including a gesture within a camera recognition range. For example, the recognition range of the camera 536 may correspond to a distance of about 0.1 m to about 5 m from the camera 536 to the user. The motion of the user may include, for example, a body part of the user, such as a face, an expression, a hand, a fist, a finger, and the like of the user, or a motion of the body part of the user. The camera 536 may recognize a received image by converting the received image into an electrical signal according to control by the processor 420 and may select a menu displayed on the electronic device 500 for a vehicle by using a recognition result corresponding to a user's motion or may perform a control operation corresponding to the motion recognition result. For example, the processor 420 uses the recognition result obtained from the camera 336 to perform control operations with respect to channel selection, channel change, volume adjustment, and available service execution in the FM/DMB.

The camera 536 may be realized as an integral type with or a separate type from the electronic device 500 for a vehicle. The separate-type camera 536 may be electrically connected to the processor 420 of the electronic device 500 for a vehicle through the communicator 440 or the inputter and the outputter 430. For example, when the camera 536 is realized as a separate type from the electronic device 500 for a vehicle, the camera 536 is disposed in a location corresponding to a face and a front upper body of a driver in order to capture an image corresponding to the face and the upper body of the driver.

The microphone 537 may receive an audio signal, such as a sound signal, and the like. The microphone 537 may receive a sound signal of the user, and the processor 420 may recognize a control command corresponding to the sound received by the microphone 337 and may perform a control operation to execute a corresponding operation. Also, the microphone 337 may not be included in the camera module 535, and may be included in the electronic device 500 for a vehicle as a separate module.

The user interface 539 may receive a user input for controlling the electronic device 500 for a vehicle. The user interface 539 may include a push button, a wheel, a keyboard, a jog dial, a touch panel, and a haptic sensor for receiving the user input.

The communicator 440 may include at least one antenna module 200 configured to perform radio communication. In detail, the communicator 440 may include at least one of a Bluetooth module 561, a wireless fidelity (Wi-fi) module 562, a global positioning system (GPS) module 563, an RF module 564, or a CP module 565. The CP module may be a modem chip set, and a network may communicate with an external electronic device through a communication network according to the communication standards, such as third generation (3G), 4G, 5G, or sixth generation (6G). Also, the communicator 440 may further include at least one antenna module (not shown) configured to perform communication according to the communication standards, such as Bluetooth low energy (BLE), near-field communication (NFC)/radio frequency identification (RFID), Wi-fi direct (WFD), ultra wideband (UWB), and/or Zigbee.

The antenna module 200 according to an embodiment of the disclosure may be a component of the antenna module 200 included in the communicator 440. For example, the antenna module 200 according to another embodiment of the disclosure may be included in the CP module 565.

Also, the components included in the electronic device 500 for a vehicle, for example, the processor 420, the inputter and the outputter 430, and the communicator 440 may communicate with one another through a vehicle network. Also, the electronic device 500 for a vehicle and other components included in the vehicle 100 may communicate with one another through the vehicle network. Here, the vehicle network may include a network according to a controller area network (CAN) and/or media oriented systems transport (MOST).

The processor 420 may control driving of the vehicle 100 based on information received from the antenna module.

Figure 17:
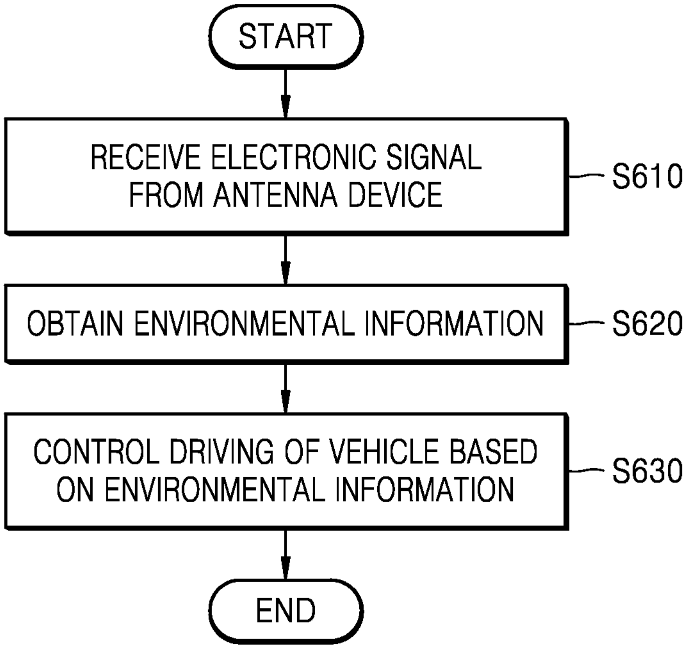
FIG. 17 is a flowchart of a method of controlling, by using an antenna module, driving of a vehicle, according to an embodiment of the disclosure.

FIG. 17 is a flowchart of a method of controlling, by using an antenna module, driving of a vehicle, according to yet another embodiment of the disclosure.

Referring to FIG. 17, the processor 420 may receive an electrical signal from the antenna module 200, 201, 202, 203, 204, 205, or 206, in operation 5610. The antenna module 200, 201, 202, 203, 204, 205, or 206 may output the electrical signal corresponding to an mmWave radio signal.

The processor 420 may obtain environmental information from the electrical signal received from the antenna module 200, 201, 202, 203, 204, 205, or 206, in operation 5620. When the antenna module 200, 201, 202, 203, 204, 205, or 206 performs communication by using an mmWave, a large volume of data may be rapidly transmitted or received. In detail, the antenna module 200, 201, 202, 203, 204, 205, or 206 may rapidly provide, to the vehicle 100, data required for safety (e.g., data required for autonomous driving, data required for a navigation service, environmental information, and the like), content (e.g., movies, music, and the like) used by a user, etc., and thus, the safety of the vehicle 100 and/or the user's convenience may be increased. The environmental information may include traffic situation information, weather information, and the like of am ambient region.

The processor 420 may control driving of the vehicle 100 according to the environmental information, in operation 5630. The processor 420 may control a driver to change at least one of a driving route or a driving speed of the vehicle 100, according to the environmental information. Although the driver is not illustrated, the driver may include a steering control unit, a speed control unit, and the like. A memory (not shown) may pre-store a control manual of the vehicle 100 matched with the environmental information. The processor 420 may control the driving of the vehicle 100 by reading, from the memory, the control manual of the vehicle 100 matched with the environmental information. For example, based on the environmental information, such as traffic information of the vehicle 100, the processor controls the driver to change the driving speed. However, the processor 420 is not limited thereto. The processor 420 may control the driving of the vehicle 100 according to the environmental information, by using a training network module of an AI system. For example, the processor 420 controls the driving of the vehicle 100 to prevent collision with a vehicle in an accident.

Figure 18:
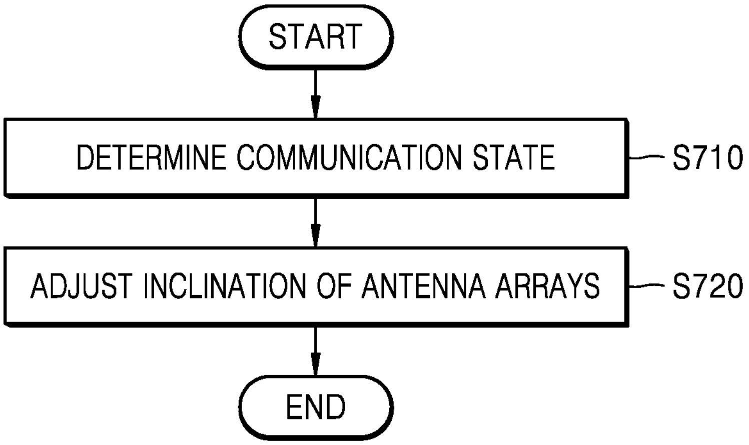
FIG. 18 is a flowchart of a method of controlling, according to a communication state, an antenna module, according to an embodiment of the disclosure.

FIG. 18 is a flowchart of a method of controlling, according to a communication state, an antenna module, according to an embodiment of the disclosure.

Referring to FIG. 18, the processor 420 may determine a communication state of the antenna module 200, in operation 5710. The processor 420 may supply radiation power to the antenna module 200, 201, 202, 203, 204, 205, or 206 through a power management module (not shown) and may perform radio communication with a base station (not shown), which is an external device, through the antenna module 200, 201, 202, 203, 204, 205, or 206. The processor 420 may identify whether a communication state (e.g., quality of a communication signal) is in a good state (e.g., a strong electric field) or a poor state (e.g., a weak electric field), through the antenna module 200, 201, 202, 203, 204, 205, or 206.

The processor 420 may adjust an inclination of the antenna arrays 240 according to the communication state, in operation 5720. For example, when it is determined that the communication state is in a poor state, the processor 420 may adjust, through the actuator 270, the inclination of the antenna arrays 240 with respect to the IFIC 220, to improve the communication state.

According to the antenna module according to an embodiment of the disclosure, the RFICs and the IFIC may be designed to have a minimum distance therebetween, and thus, an insertion loss of an IF signal may be reduced.

According to the antenna module according to another embodiment of the disclosure, the RFICs and the IFIC may be designed to have the minimum distance therebetween, and thus, the antenna module may be implemented to have a small size, and thus, costs may be reduced.

The antenna arrays, the RFICs, and the IFIC according to yet another embodiment of the disclosure may be arranged on a rigid PCB, and thus, when yielding, the process difficulty may be decreased, and the yield efficiency may be increased.

When a flexible PCB is arranged between the antenna arrays and the IFIC according to yet another embodiment of the disclosure, an angle of the antenna arrays with respect to the IFIC may be adjusted, and thus, the antenna efficiency may be increased.

An antenna device mounted on a vehicle, according to yet another embodiment of the disclosure, may include a PCB.

The antenna device mounted on a vehicle, according to yet another embodiment of the disclosure, may include a plurality of antenna arrays arranged on a first surface of the PCB to be apart from each other.

The antenna device mounted on a vehicle, according to yet another embodiment of the disclosure, may include a plurality of RFICs arranged on a second surface facing the first surface of the PCB and respectively corresponding to and electrically connected to the plurality of antenna arrays.

The antenna device mounted on a vehicle, according to yet another embodiment of the disclosure, may include an IFIC arranged on the second surface of the PCB to be apart from each of the plurality of RFICs by a same distance, the IFIC being electrically connected to each of the plurality of RFICs.

The plurality of RFICs according to yet another embodiment of the disclosure may be arranged to be symmetrically apart from each other with respect to the IFIC.

The plurality of RFICs according to yet another embodiment of the disclosure may be arranged to be rotationally symmetrically apart from each other with respect to the IFIC.

Each of the plurality of RFICs according to yet another embodiment of the disclosure may be arranged to overlap the corresponding antenna array in a thickness direction of the PCB.

A center of each of the plurality of RFICs according to yet another embodiment of the disclosure may be arranged to overlap a center of the corresponding antenna array in a thickness direction of the PCB.

A plurality of connection lines connecting each of the plurality of RFICs with the IFIC, according to yet another embodiment of the disclosure, may further be included.

At least one of the plurality of connection lines according to yet another embodiment of the disclosure may be a coaxial cable.

At least one of the plurality of connection lines according to yet another embodiment of the disclosure may include a conductive line included in the PCB.

The plurality of connection lines according to yet another embodiment of the disclosure may not overlap each other in a thickness direction of the PCB.

The plurality of connection lines according to yet another embodiment of the disclosure may include a straight area.

The straight area according to yet another embodiment of the disclosure may be equal to or greater than 50% of an entire length of the connection lines.

The PCB according to yet another embodiment of the disclosure may include an intermediate area and an edge area surrounding the intermediate area.

The plurality of antenna arrays and the plurality of RFICs according to yet another embodiment of the disclosure may be arranged in the edge area.

The IFIC according to yet another embodiment of the disclosure may be arranged in the intermediate area.

The plurality of antenna arrays according to yet another embodiment of the disclosure may be arranged to surround the intermediate area.

A section of the intermediate area according to yet another embodiment of the disclosure may have a regular polygonal shape.

A number of the plurality of antenna arrays according to yet another embodiment of the disclosure may be less than or equal to a number of segments of the regular polygonal shape.

The intermediate area and the edge area according to yet another embodiment of the disclosure may be rigid areas.

The PCB according to yet another embodiment of the disclosure may further include a boundary area connecting the intermediate area and the edge area.

The boundary area according to yet another embodiment of the disclosure may be a flexible area.

At least one of the plurality of antenna arrays according to yet another embodiment of the disclosure may be arranged to be inclined with respect to the IFIC.

An actuator configured to adjust a position of at least one of the plurality of antenna arrays, such that the at least one of the plurality of antenna arrays is arranged to be inclined with respect to the IFIC, according to yet another embodiment of the disclosure, may further be included. The plurality of antenna arrays according to yet another embodiment of the disclosure may transmit or receive a radio signal of an mmWave band.

A vehicle according to yet another embodiment of the disclosure may include a panel forming an exterior shape of the vehicle and including an opening.

The vehicle according to yet another embodiment of the disclosure may include a PCB arranged in the opening.

The vehicle according to yet another embodiment of the disclosure may include a plurality of antenna arrays arranged on a first surface of the PCB to be apart from each other, the first surface being toward an outside of the panel.

The vehicle according to yet another embodiment of the disclosure may include a plurality of RFICs arranged on a second surface of the PCB, the second surface being toward an inside of the panel, the plurality of RFICs being respectively corresponding to and electrically connected to the plurality of antenna arrays.

The vehicle according to yet another embodiment of the disclosure may include an IFIC arranged on the second surface of the PCB to be apart from each of the plurality of RFICs by a same distance, the IFIC being electrically connected to the plurality of RFICs.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna device mounted on a vehicle, the antenna device comprising:

a printed circuit board (PCB);

a plurality of antenna arrays arranged on a first surface of the PCB to be apart from each other;

a plurality of radio frequency integrated circuits (RFICs) arranged on a second surface facing the first surface of the PCB and respectively corresponding to and electrically connected to the plurality of antenna arrays; and an intermediate frequency integrated circuit (IFIC) arranged on the second surface of the PCB to be apart from each of the plurality of RFICs by a same distance, the IFIC being electrically connected to each of the plurality of RFICs, wherein the PCB comprises an intermediate area and an edge area surrounding the intermediate area, wherein the plurality of antenna arrays and the plurality of RFICs are arranged in the edge area, and the IFIC is arranged in the intermediate area, and wherein each of the plurality of antenna arrays is configured to overlap with a corresponding RFIC, but not with the IFIC, in a thickness direction of the PCB.

2. The antenna device of claim 1, wherein the plurality of RFICs are arranged to be symmetrically apart from each other with respect to the IFIC.

3. The antenna device of claim 1, wherein the plurality of RFICs are arranged to be rotationally symmetrically apart from each other with respect to the IFIC.

4. The antenna device of claim 1, wherein each of the plurality of RFICs is arranged to overlap the corresponding antenna array in a thickness direction of the PCB.

5. The antenna device of claim 1, wherein a center of the plurality of RFICs is arranged to overlap a center of the plurality of antenna arrays in the thickness direction of the PCB.

6. The antenna device of claim 1, further comprising:

a plurality of connection lines connecting each of the plurality of RFICs with the IFIC.

7. The antenna device of claim 6, wherein at least one of the plurality of connection lines is a coaxial cable.

8. The antenna device of claim 6, wherein at least one of the plurality of connection lines comprises a conductive line included in the PCB.

9. The antenna device of claim 6, wherein the plurality of connection lines do not overlap each other in a thickness direction of the PCB.

10. The antenna device of claim 6, wherein the plurality of connection lines comprise a straight area.

11. The antenna device of claim 10, wherein the straight area is equal to or greater than 50% of an entire length of the connection lines.

12. The antenna device of claim 1, wherein the plurality of antenna arrays are arranged to surround the intermediate area.

13. The antenna device of claim 1, wherein a section of the intermediate area has a regular polygonal shape.

14. The antenna device of claim 13, wherein a number of the plurality of antenna arrays is less than or equal to a number of segments of the regular polygonal shape.

15. The antenna device of claim 1, wherein the intermediate area and the edge area are rigid areas.

16. The antenna device of claim 1, wherein the PCB further comprises a boundary area connecting the intermediate area to the edge area, and wherein the boundary area is a flexible area.

17. The antenna device of claim 1, wherein at least one of the plurality of antenna arrays is arranged to be inclined with respect to the IFIC.

18. The antenna device of claim 1, further comprising:

an actuator configured to adjust a position of at least one of the plurality of antenna arrays, such that the at least one of the plurality of antenna arrays is arranged to be inclined with respect to the IFIC.

19. A vehicle comprising:

a panel forming an exterior shape of the vehicle and comprising an opening;

a printed circuit board (PCB) arranged in the opening;

a plurality of antenna arrays arranged on a first surface of the PCB to be apart from each other, the first surface being toward an outside of the panel;

a plurality of radio frequency integrated circuits (RFICs) arranged on a second surface of the PCB, the second surface being toward an inside of the panel, the plurality of RFICs being respectively corresponding to and electrically connected to the plurality of antenna arrays; and an intermediate frequency integrated circuit (IFIC) arranged on the second surface of the PCB to be apart from each of the plurality of RFICs by a same distance, the IFIC being electrically connected to the plurality of RFICs, wherein the PCB comprises an intermediate area and an edge area surrounding the intermediate area, wherein the plurality of antenna arrays and the plurality of RFICs are arranged in the edge area, and the IFIC is arranged in the intermediate area, and wherein each of the plurality of antenna arrays is configured to overlap with a corresponding RFIC, but not with the IFIC, in a thickness direction of the PCB.

* * * * *